(12) United States Patent
Tan et al.

(10) Patent No.: US 10,243,783 B2
(45) Date of Patent: *Mar. 26, 2019

(54) METHOD AND DEVICE FOR PROCESSING COMMUNICATION PATH

(71) Applicant: Huawei Technologies Co., Ltd., Shenzhen (CN)

(72) Inventors: Shiyong Tan, Beijing (CN); Hui Ni, Beijing (CN); Hui Cai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

This patent is subject to a terminal disclaimer.

(21) Appl. No.: 15/291,838

(22) Filed: Oct. 12, 2016

(65) Prior Publication Data

US 2017/0033978 A1 Feb. 2, 2017

Related U.S. Application Data

(63) Continuation of application No. 14/610,693, filed on Jan. 30, 2015, now Pat. No. 9,503,317, which is a
(Continued)

(51) Int. Cl.
*H04L 12/24* (2006.01)
*H04L 12/707* (2013.01)
*H04W 24/04* (2009.01)

(52) U.S. Cl.
CPC .......... *H04L 41/0668* (2013.01); *H04L 41/06* (2013.01); *H04L 41/0604* (2013.01); *H04L 45/22* (2013.01); *H04W 24/04* (2013.01)

(58) Field of Classification Search
CPC . H04L 41/0668; H04L 41/06; H04L 41/0604; H04L 45/22; H04W 24/04
See application file for complete search history.

(56) References Cited

U.S. PATENT DOCUMENTS 9,503,317 B2 * 11/2016 Tan .................. H04L 41/06
2002/0006114 A1 1/2002 Bjelland et al.
(Continued)

FOREIGN PATENT DOCUMENTS

CN 1592252 A 3/2005
CN 1725702 A 1/2006
(Continued)

OTHER PUBLICATIONS

U.S. Appl. No. 14/610,693, filed Jan. 30, 2015.
(Continued)

*Primary Examiner* — Albert T Chou
(74) *Attorney, Agent, or Firm* — Leydig, Voit & Mayer, Ltd.

(57) ABSTRACT

Embodiments of the present invention relate to a method and a device for processing a communication path. The method includes: obtaining a path processing parameter from local configuration information or from a control layer device, obtaining path information and/or a restarting counter parameter from the control layer device; increasing a path with an opposite-end device when the path information is of increasing a path, identifying the state of the path and/or the state of the opposite-end device using the path processing parameter and/or the restarting counter parameter the opposite-end device; reporting the fault state of the path and/or the reset state of the opposite-end device to the control layer device when the path fails and/or the opposite-end device is reset, releasing sessions on the failed path and/or on a path connected with the reset opposite-end device.

12 Claims, 12 Drawing Sheets

Related U.S. Application Data continuation of application No. PCT/CN2012/079472, filed on Aug. 1, 2012.

(56) References Cited

U.S. PATENT DOCUMENTS

| | | |
|---|---|---|
| 2010/0208596 A1 | 8/2010 | Jin |
| 2012/0039304 A1 | 2/2012 | Kim et al. |
| 2012/0044865 A1 | 2/2012 | Singh et al. |
| 2012/0117140 A1 | 5/2012 | Wang et al. |
| 2012/0236708 A1 | 9/2012 | Kompella et al. |
| 2013/0265990 A1 | 10/2013 | Lee et al. |
| 2013/0272247 A1 | 10/2013 | Guo |
| 2013/0339438 A1 | 12/2013 | Cherian et al. |

FOREIGN PATENT DOCUMENTS

| | | |
|---|---|---|
| CN | 1866909 A | 11/2006 |
| CN | 101064687 A | 10/2007 |
| CN | 101364940 A | 2/2009 |
| CN | 101729360 A | 6/2010 |
| CN | 102195828 A | 9/2011 |
| CN | 102355456 A | 2/2012 |
| EP | 1580942 A2 | 9/2005 |
| KR | 20100093389 A | 8/2010 |
| WO | 0205573 A2 | 1/2002 |
| WO | WO 0205573 A2 | 1/2002 |
| WO | 2009150499 A1 | 12/2009 |
| WO | WO 2009150499 A1 | 12/2009 |
| WO | 2011095256 A1 | 8/2011 |
| WO | WO 2011095256 A1 | 8/2011 |

OTHER PUBLICATIONS

"3rd Generation Partnership Project; Technical Specification Group Core Network and Terminals; General Packet Radio System (GPRS) Tunnelling Protocol User Plane (GTPv1-U) (Release 10)," 3GPP TS 29.281, V10.2.0, pp. 1-25, 3rd Generation Partnership Project, Valbonne, France (Jun. 2011).

"3rd Generation Partnership Project; Technical Specification Group Core Network and Terminals; Proxy Mobile 1Pv6 (PMIPv6) Based Mobility and Tunnelling Protocols; Stage 3 (Release 11)," 3GPP TS 29.275, V11.3.0, pp. 1-79, 3rd Generation Partnership Project, Valbonne, France (Jun. 2012).

"3rd Generation Partnership Project; Technical Specification Group Core Network and Terminals; General Packet Radio Service (GPRS); GPRS Tunnelling Protocol (GTP) Across the Gn and Gp Interface (Release 11)," 3GPP TS 29.060, V11.3.0, pp. 1-174, 3rd Generation Partnership Project, Valbonne, France (Jun. 2012).

"3rd Generation Partnership Project; Technical Specification Group Services and System Aspects; General Packet Radio Service (GPRS); Service Description; Stage 2 (Release 11)," 3GPP TS 23.060, V11.2.0, pp. 1-335, 3rd Generation Partnership Project, Valbonne, France (Jun. 2012).

"3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 11)," 3GPP TS 29.274, V11.3.0, pp. 1-219, 3rd Generation Partnership Project, Valbonne, France (Jun. 2012).

Devarapalli et al., "Heartbeat Mechanism for Proxy Mobile IPv6," Internet Engineering Task Force (IETF), Request for Comments: 5847, pp. 1-11, IETF Trust, Reston, Virginia (Jun. 2010).

\* cited by examiner

METHOD AND DEVICE FOR PROCESSING COMMUNICATION PATH

CROSS-REFERENCE TO RELATED APPLICATIONS

This application is a continuation of U.S. patent application Ser. No. 14/610,693, filed on Jan. 30, 2015, which is a continuation of International Application No. PCT/CN2012/079472, filed on Aug. 1, 2012. All of the afore-mentioned patent applications are hereby incorporated by reference in their entireties.

FIELD OF THE INVENTION

The present invention relates to the field of communication, and in particular, to a method and a device for processing a communication path.

BACKGROUND OF THE INVENTION

With the development of mobile internet services, as well as the integration of many types of mobile access networks, a gateway device needs to develop gradually toward a more refined service control and charging function on the basis of completing the basic data forwarding function, thereby supporting richer service implementation and control of the operators.

Currently, under the existing control and forwarding decoupling architecture, the gateway device is divided into two parts, which are respectively called a control layer device and a forwarding layer device. The control layer device processes signaling with external devices, such as the signaling with the authentication, authorization, and accounting (AAA) server, the signaling with the Policy and Charging Rules Function (PCRF) and so on. After completing the signaling negotiation, the control layer device sends signaling or information to be forwarded by the forwarding layer device to the forwarding layer device, the forwarding layer device forwards the signaling or information to be forwarded to the external devices. Therefore, the current control layer device is responsible for processing the signaling, the forwarding layer device is responsible for forwarding the corresponding signaling or information.

It is defined in the General Packet Radio Service (GPRS) Tunneling Protocol (GTP) that the control layer device identifies the state of an opposite-end device and whether the corresponding transmission link fails, and performs corresponding process to the failed path and the opposite-end device reset, the forwarding layer device only needs to transparently transmit the corresponding signaling or information of path management mechanism in two directions, therefore, the deficiencies in the prior art are that:

Since the control layer device generally needs to be interconnected with a large number of base stations, base station controllers and other gateway devices, and each external device may also adopt multiple Internet Protocol (IP) addresses, and thus a huge number of path states and the states of the corresponding opposite-end devices needs to be identified, the control layer device also needs to transparently transmit a lot of information through the forwarding layer device, thus significant signaling load is caused on the interface between the control layer device and the forwarding plane device, moreover, when the interface between the control layer device and the forwarding plane device fails, misjudgment of the path state by the control layer device will be caused, and meanwhile misjudgment of the state of the opposite-end device corresponding to the path will also be caused.

SUMMARY OF THE INVENTION

The object of the present invention is to provide a method and a device for processing a communication path, so as to solve the problem in the prior art that a lot of signaling and information load is caused on the interface between a control layer device and a forwarding plane device, and the problem of misjudgment.

In a first aspect, embodiments of the present invention provide a method for processing a communication path, the method includes:

obtaining a path managing parameter from local configuration information or from a control plane device, obtaining path information and/or a restarting counter parameter from the control layer device;

increasing a path with an opposite-end device when the path information is of increasing a path, identifying the state of the path and/or the state of the opposite-end device using the path managing parameter and/or the restarting counter parameter replied by the opposite-end device;

reporting the fault state of the path and/or the reset state of the opposite-end device to the control layer device when the path fails and/or the opposite-end device is reset, releasing sessions on the failed path and/or on a path connected with the reset opposite-end device.

In a second aspect, embodiments of the present invention provide a method for processing a communication path, the method includes:

obtaining path managing parameter from local configuration information or from a control plane device, obtaining session information and/or a restarting counter parameter from the control layer device;

determining whether to increase a path with an opposite-end device when the session information is of establishing a session;

if increasing the path with the opposite-end device, identifying the state of the path and/or the state of the opposite-end device using the path managing parameter and/or the restarting counter parameter replied by the opposite-end device;

reporting the fault state of the path and/or the reset state of the opposite-end device to the control layer device when the path fails and/or the opposite-end device is reset, releasing all sessions on the failed path and/or on a path connected with the reset opposite-end device.

In a third aspect, embodiments of the present invention provide a device for processing a communication path, the device includes:

an obtaining unit, configured to obtain path managing parameter from local configuration information or from a control plane device, obtain path information and/or a restarting counter parameter from the control layer device, and send the obtained path managing parameter, path information and/or restarting counter parameter to an identifying unit;

the identifying unit, configured to receive the path managing parameter, the path information and/or the restarting counter parameter sent by the obtaining unit, increase a path with an opposite-end device when the path information is of increasing a path, identify the state of the path and/or the state of the opposite-end device using the path managing parameter and/or the restarting counter parameter replied by the opposite-end device, and send the state of the path and/or the state of the opposite-end device to an executing unit;

the executing unit, configured to receive the state of the path and/or the state of the opposite-end device sent by the identifying unit, report the fault state of the path and/or the reset state of the opposite-end device to the control layer device when the path fails and/or the opposite-end device is reset, and release sessions on a failed path and/or on a path connected with the reset opposite-end device.

In a fourth aspect, embodiments of the present invention provide a device for processing a communication path, the device includes:

an obtaining unit, configured to obtain a path managing parameter from local configuration information or from a control layer device, obtain session information and/or a restarting counter parameter from the control layer device, send the session information to a determining unit, and send the path managing parameter and/or the restarting counter parameter to an identifying unit;

the determining unit, configured to receive the session information, when the session information is of establishing a session, determine whether to increase a path with an opposite-end device, and send a determining result to the identifying unit;

the identifying unit, configured to receive the path managing parameter and/or the restarting counter parameter sent by the obtaining unit and receive the determining result sent by the determining unit, if increasing the path with the opposite-end device, identify the state of the path and/or the state of the opposite-end device using the path managing parameter and/or the restarting counter parameter replied by the opposite-end device, and send the identified state of the path and/or the state of the opposite-end device to an executing unit;

the executing unit, configured to receive the state of the path and/or the state of the opposite-end device sent by the identifying unit, report the fault state of the path and/or the reset state of the opposite-end device to the control layer device when the path fails and/or the opposite-end device is reset, and release all sessions on the failed path and/or on a path connected with the reset opposite-end device.

In a fifth aspect, embodiments of the present invention provide a device for processing a communication path, the device includes:

a receiver, configured to obtain a path managing parameter from local configuration information or from a control plane device, obtain path information and/or a restarting counter parameter from the control layer device, and send the obtained path managing parameter, path information and/or restarting counter parameter to a processor;

the processor, configured to receive the path managing parameter, the path information and/or the restarting counter parameter sent by the receiver, increase a path with an opposite-end device when the path information is of increasing a path, identify the state of the path and/or the state of the opposite-end device using the path managing parameter and/or the restarting counter parameter replied by the opposite-end device;

the processor is also configured to report the state of the path and/or the state of the opposite-end device to the control layer device when the path fails and/or the opposite-end device is reset, and release all sessions on the failed path and/or on a path connected with the reset opposite-end device;

a memory, configured to store execution procedure of the processor.

In a sixth aspect, embodiments of the present invention provide a device for processing a communication path, the device includes:

a receiver, configured to obtain a path managing parameter from local configuration information or from a control layer device, obtain session information and/or a restarting counter parameter from the control layer device, and send the obtained path managing parameter, session information and/or restarting counter parameter to a processor;

the processor, configured to receive the path managing parameter, the session information and/or the restarting counter parameter sent by the receiver, when the session information is of establishing a session, determine whether to increase a path with an opposite-end device;

the processor is also configured to, if increasing the path with the opposite-end device, identify the state of the path and/or the state of the opposite-end device using the path managing parameter and/or the restarting counter parameter replied by the opposite-end device;

the processor is also configured to report the fault state of the path and/or the reset state of the opposite-end device to the control layer device when the path fails and/or the opposite-end device is reset, and release all sessions on the failed path and/or on a path connected with the reset opposite-end device;

a memory, configured to store execution procedure of the processor.

By applying a method and a device for processing a communication path according to embodiments of the present invention, a forwarding layer device obtains various parameters from a control layer device or local network system, determines, according to the instruction of the control layer device or by itself, whether to establish or delete a path with an opposite-end device, and identifies the state of the path and the state of the opposite-end device using the obtained various parameters and reports to the control layer device, performs corresponding process according to the processing information of the control layer device, compared to the prior art, signaling or information between the control layer device and the forwarding layer device is reduced, and misjudgment of the path or the opposite-end device reset is reduced.

DETAILED DESCRIPTION OF THE EMBODIMENTS

In order to illustrate the objects, technical solutions and advantages of the present invention more clearly, embodiments of the present invention are described in further details with reference to the accompanying drawings.

Figure 1:
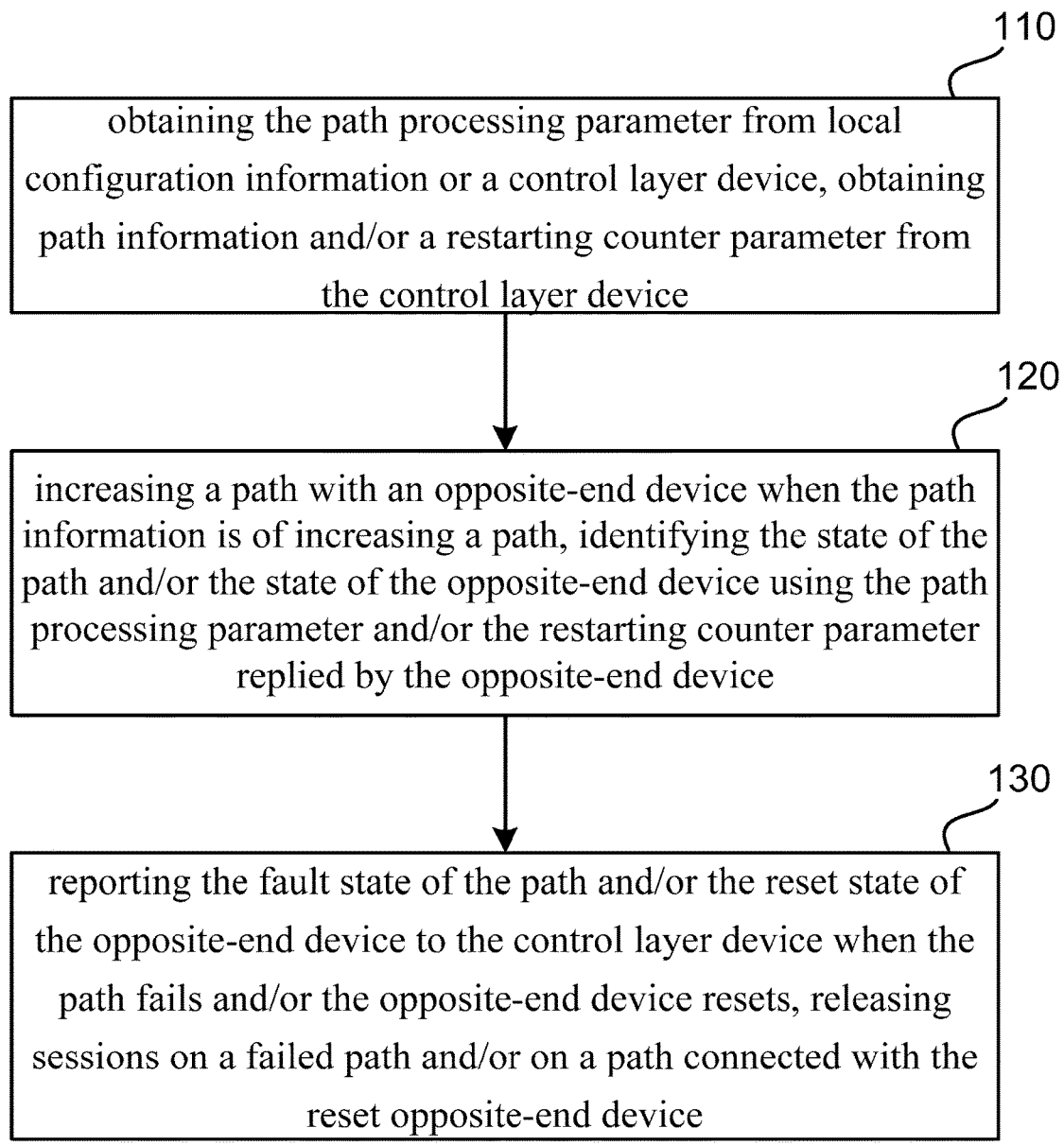
FIG. 1 is a flowchart of a method for processing a communication path according to embodiment 1 of the present invention.

A method for processing a communication path, which is disclosed in embodiments of the present invention, is described in details taking FIG. 1 as an example, and FIG. 1 is a flowchart of a method for processing a communication path according to embodiment 1 of the present invention.

Figure 2:
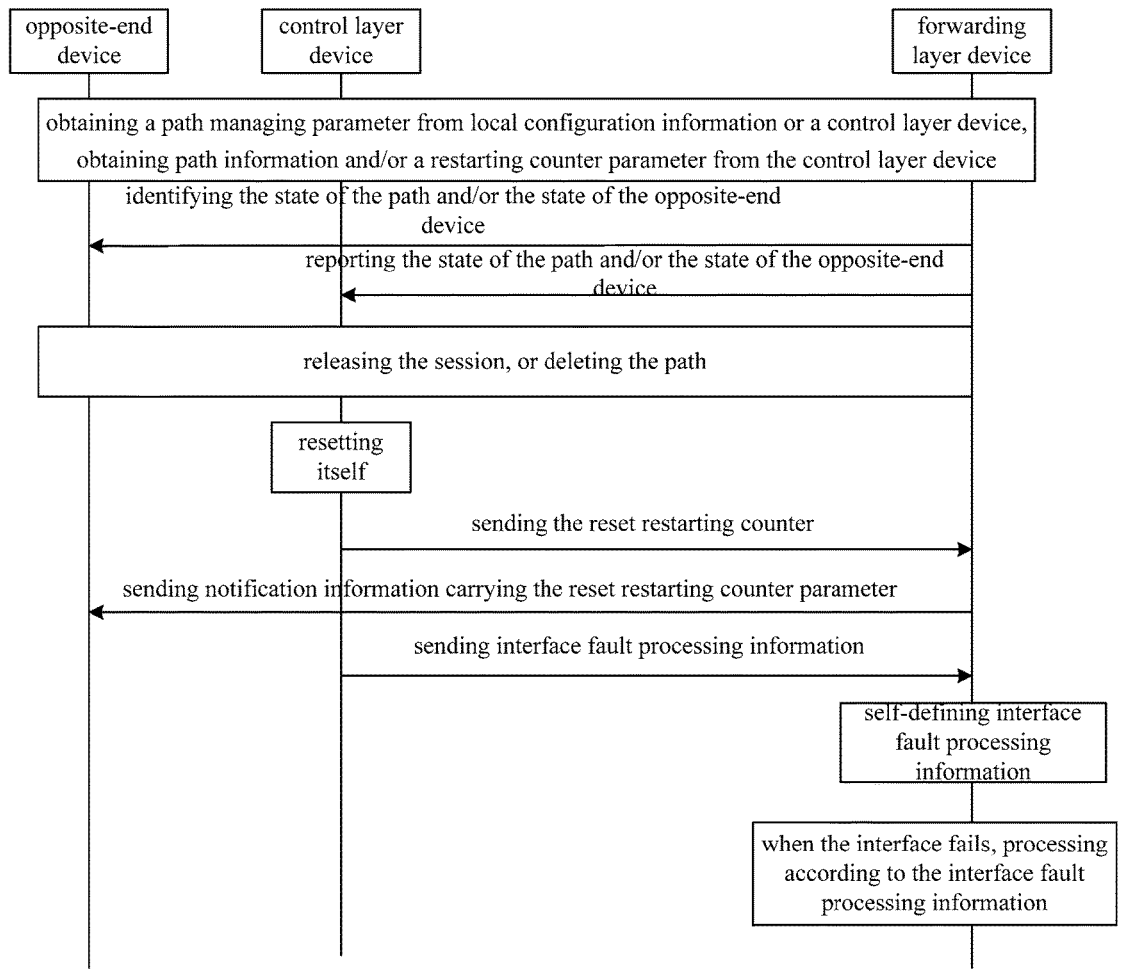
FIG. 2 is a signaling flowchart of the method for processing the communication path according to embodiment 1 of the present invention.
Figure 3:
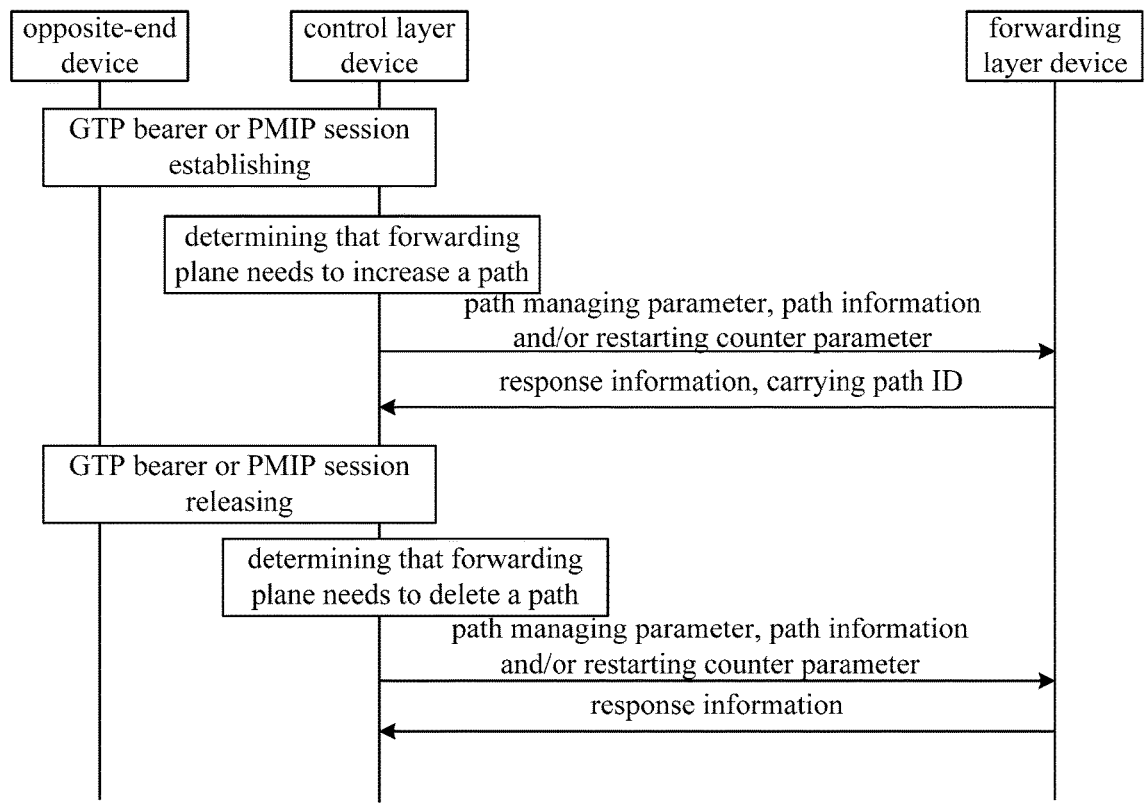
FIG. 3 is a signaling flowchart of obtaining information from a control layer device according to embodiment 1 of the present invention.

In the method for processing the communication path according to embodiments of the present invention, a forwarding layer device obtains a path managing parameter from local configuration information or from a control layer device, obtains path information and/or a restarting counter parameter from the control layer device, the forwarding layer device identifies the state of a path and/or the state of an opposite-end device according to the obtained related information, the forwarding layer device reports the identified fault state of the path and/or the reset state of the opposite-end device to the control layer device when identifying that the path fails and/or the opposite-end device is reset, meanwhile, releases sessions on the failed path and/or on a path connected with the reset opposite-end device, the executive body in the embodiment of the present invention is the forwarding layer device, as shown in FIG. 1, and combined with the signaling flowchart in FIG. 2, which is a signaling flowchart of the method for processing the communication path according to embodiment 1 of the present invention, the following steps are needed for implementing the method for processing the communication path, which specifically include:

Step 110, The forwarding layer device obtains the path managing parameter from the local configuration information or from the control layer device, and obtains the path information and/or the restarting counter parameter from the control layer device;

Specifically, in one implementing mode, as shown in FIG. 3, which is a signaling flowchart of obtaining information from the control layer device according to embodiment 1 of the present invention, at first, the control layer device performs communication negotiation with the opposite-end device, where the communication negotiation specifically is: a communication negotiation with an opposite-end device which is ready to establish a communication path about establishing the session, or a communication negotiation with an opposite-end device which has already established a communication path about whether to release the session, the communication negotiation is the prior art, which will not be repeated here, after the communication negotiation with the opposite-end device, the control layer device determines whether the forwarding layer needs to increase a path (or delete a path), after completing the determination, the control layer device will send the path managing parameter, the path information and/or the restarting counter parameter to the forwarding layer device;

The path managing parameter includes: a sending period, a time threshold, a threshold of times and other parameters. The path information carries a session path type (GTP or Proxy Mobile IPv6 (PMIP)), a source IP address, a source port, a destination IP address, and a destination port.

Figure 4:
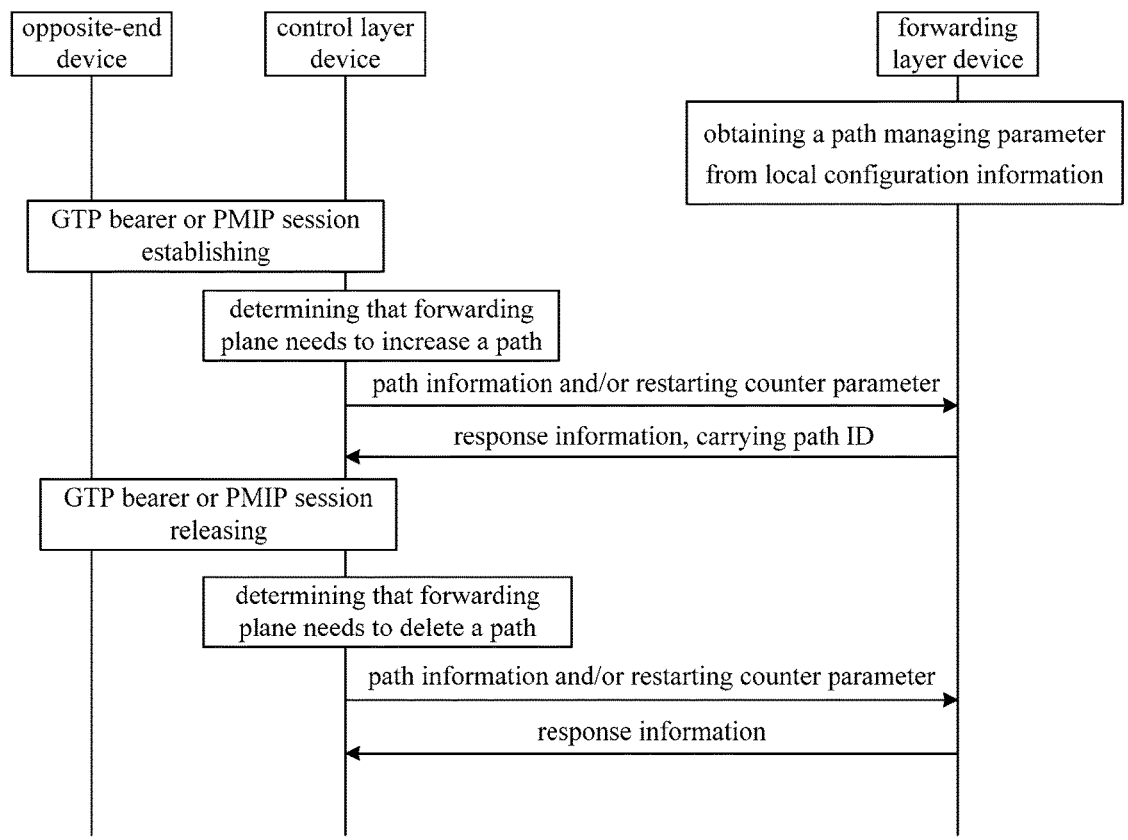
FIG. 4 is a signaling flowchart of obtaining information from local configuration information according to embodiment 1 of the present invention.

In another implementing mode, as shown in FIG. 4, which is a signaling flowchart of obtaining information from the local configuration information according to embodiment 1 of the present invention; the forwarding layer device obtains a path managing parameter from the local configuration information, and then the control layer device performs communication negotiation with the opposite-end device, the communication negotiation specifically is: a communication negotiation with an opposite-end device which is ready to establish a communication path about establishing the session, or a communication negotiation with an opposite-end device which has already established a communication path about whether to release the session, the communication negotiation is the prior art, which will not be repeated here, after the communication negotiation with the opposite-end device, the control layer device determines whether the forwarding layer needs to increase a path (or delete a path), after completing the determination, the control layer device will send the path information and/or the restarting counter parameter to the forwarding layer device;

The path managing parameter includes: a sending period, a time threshold, a threshold of times and other parameters. The path information carries a session path type (GTP or PMIP), a source IP address, a source port, a destination IP address, and a destination port.

Figure 5:
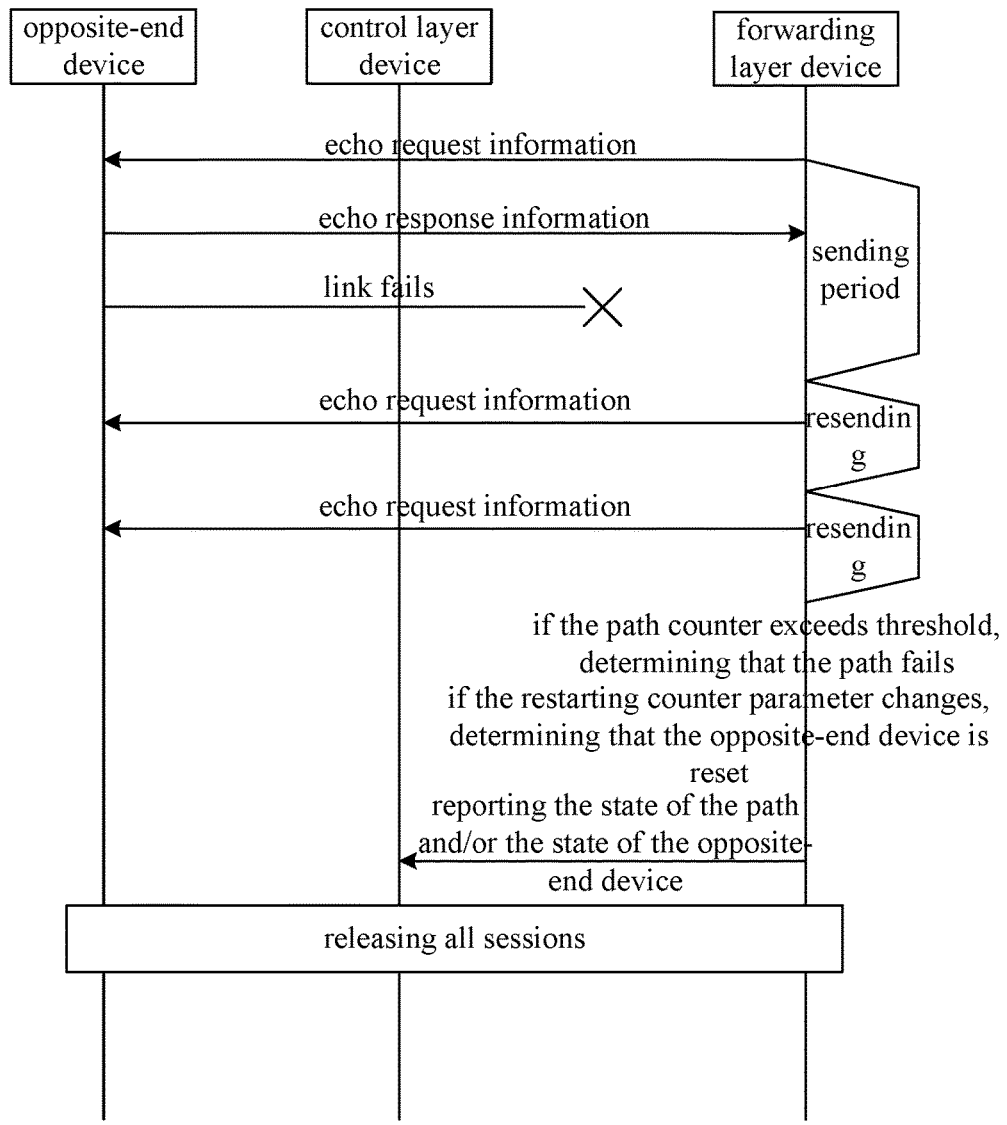
FIG. 5 is a signaling flowchart of identifying the state of a path and the state of an opposite-end device according to embodiment 1 of the present invention.

Step 120, Increasing a path with the opposite-end device when the path information is of increasing a path, identifying the state of the path and/or the state of the opposite-end device using the path managing parameter and/or the restarting counter parameter replied by the opposite-end device;

Specifically, according to the description of step 110, the control layer device communicates with the opposite-end device about being ready to establish GTP bearer or PMIP session, the control layer device determines whether to increase a path, if it deems necessary to increase the path, carries information of increasing a path in the path information, and sends the path information to the forwarding layer device, instructs the forwarding layer device to establish the path with the opposite-end device; the forwarding layer device increases, according to the path information of the control layer device, the path with the opposite-end device which communicates with the control layer device;

After increasing the path with the opposite-end device, the forwarding layer device sends response information to the control layer device, and sets a path counter for this path;

the response information is used to notify the control layer device that the path has been increased with the opposite-end device;

Optionally, after increasing the path with the opposite-end device, the forwarding layer device can also receive a path label which is set for the path by the control layer device; or the forwarding layer device self-defines a path label set for the path; or the forwarding layer device identifies the path using the path type, the path IP address, and the path port carried in the path information, so that the response information also includes the path label of the path;

According to the description of step 110, the control layer device communicates with the opposite-end device about being ready to release GTP bearer or PMIP session, the control layer device determines whether to delete the path, if it deems necessary to delete the path, carries information of deleting the path in the path information, and sends the path information to the forwarding layer device, instructs the forwarding layer device to delete the path with the opposite-end device; the forwarding layer device deletes, according to the path information of the control layer device, the existing path with the opposite-end device, and sends response information to the control layer device, to notify the control layer device that the existing path with the opposite-end device has been deleted;

It should be noted that, it has been described in step 110 that the path managing parameter can be obtained from the local configuration information of the forwarding layer or from the control layer device, when the values of the obtained path managing parameter are different, the path managing parameter sent by the control layer device is used in preference, moreover, the path managing parameter sent by the control layer device is applicable for one path as well as a plurality of paths;

The forwarding layer device identifies the state of the path and/or the state of the opposite-end device using the obtained path managing parameter and/or the restarting counter parameter, the specific process is, as shown in FIG. 5, which is a signaling flowchart of identifying the state of the path and the state of the opposite-end device according to embodiment 1 of the present invention:

according to the time threshold, the forwarding layer device sends echo request information to the opposite-end device periodically, the period can be set as needed, such as 30 seconds; the echo request information can further include the restarting counter parameter, the forwarding layer device determines whether the echo response information sent by the opposite-end device is received within the time threshold; if the forwarding layer device receives the echo response information sent by the opposite-end device within the time threshold, the forwarding layer device clears the path counter of this path, meanwhile, determines whether the echo response information includes the restarting counter parameter replied by the opposite-end device, if the echo response information includes the restarting counter parameter replied by the opposite-end device, identifies whether the value of the restarting counter parameter is changed (generally, whether the value of the restarting counter parameter is incremented by 1), if the value of the restarting counter parameter is incremented by 1, the forwarding layer device confirms that the opposite-end device has been reset, then sets the state of the opposite-end device as a reset state;

if the echo response information sent by the opposite-end device is not received within the time threshold, the forwarding layer device makes the value of the path counter of this path be incremented by 1;

then the forwarding layer device determines whether the value of the path counter of this path exceeds the threshold of times; if the value of the path counter of this path exceeds the threshold of times, sets the state of this path as a fault state.

Step 130, The forwarding layer device reports the fault state of the path and/or the reset state of the opposite-end device to the control layer device when the path fails and/or the opposite-end device is reset, releases sessions on the failed path and/or on a path connected with the reset opposite-end device.

Specifically, according to the description of step 120, when the path fails and/or the opposite-end device is reset, the forwarding layer device reports the fault state of the path and/or the reset state of the opposite-end device to the control layer device using the path label or using the path type, the path IP address, and the path port carried in the path information in step 120, meanwhile, releases the sessions on the failed path and/or on the path connected with the reset opposite-end device by itself;

When the state of the path is the fault state, after reporting the fault state of the path to the control layer device, the forwarding layer device releases all sessions on the failed path, clears the information of the failed path, such as GTP bearer or PMIP session, or directly delete the failed path;

When the state of the opposite-end device is the reset state, after reporting the reset state of the opposite-end device to the control layer device, the forwarding layer device releases all sessions on the path, clears the information of the path, such as GTP bearer or PMIP session, or directly delete the path;

Optionally, after the forwarding layer device processes the path with fault state or the reset state of the opposite-end device, it can also include steps of: receiving reset information of the control layer device itself which is sent by the control layer device, the reset information includes the restarting counter parameter which is reset by the control layer device; sending notification information carrying the reset restarting counter parameter to the opposite-end device which communicates with the control layer device, so that the opposite-end device can be notified that the control layer device resets itself; the steps can be performed at any of the steps above;

Specifically, when the control layer device fails, the control layer device resets itself, after resetting itself, the control layer device sends the reset information of itself to the forwarding layer device, the forwarding layer device receives the reset information of the control layer device itself which is sent by the control layer device, where the reset information includes the restarting counter parameter which is reset by the control layer device; after receiving the restarting counter parameter which is reset by the control layer device, the forwarding layer device sends the notification information carrying the reset restarting counter parameter to the opposite-end device which communicates with the control layer device, so that all the opposite-end devices can be notified that the control layer device resets itself, and can reset the restarting counter parameters.

Optionally, after the forwarding layer device processes the path with fault state or the reset state of the opposite-end device, it can also include the step of: receiving first interface fault processing information sent by the control layer device;

Specifically, the control layer device also sends the first interface fault processing information to the forwarding layer device, so as to instruct the process mode of the forwarding layer device processing interface fault when a problem of the interface between the control layer device and the forwarding layer device occurs, the step can be performed at any of the steps above;

The first interface fault processing information is instructed by the control layer device for any or all of the sessions, the forwarding layer device receives the first interface fault processing information sent by the control layer device; the first interface fault processing information instructed by the control layer device for any of the sessions is set as the first priority, the first interface fault processing information instructed by the control layer device for all of the sessions is set as the second priority; or The forwarding layer device self-defines second interface fault processing information, the self-defined second interface fault processing information is set as the third priority;

The first priority is higher than the second priority and the third priority, the second priority is higher than the third priority;

When the interface with the control layer device fails, the forwarding layer device processes according to the priority of the received interface fault processing information;

The interface fault processing information specifically is: terminating the connected session immediately when the interface with the control layer device fails; or terminating the connected session after the allocated quota is exhausted when the interface with the control layer device fails; or keeping the connected session when the interface with the control layer device fails.

By applying the method for processing the communication path according to embodiments of the present invention, the forwarding layer device obtains various parameters from the control layer device or the local configuration information, increases or deletes the path with the opposite-end device according to the instruction of the control layer device, and identifies the state of the path and the state of the opposite-end device using the obtained various parameters, and performs corresponding process to the failed path and/or the path connected with the reset opposite-end device, compared to the prior art, the control layer device performs corresponding process by itself to the failed path or the path connected with the reset opposite-end device, signaling or information between the control layer device and the forwarding layer device is reduced, and misjudgment of the path or the opposite-end device reset is reduced.

In order to illustrate the objects, technical solutions and advantages of the present invention more clearly, embodiments of the present invention are described in further details with reference to the accompanying drawings.

Figure 6:
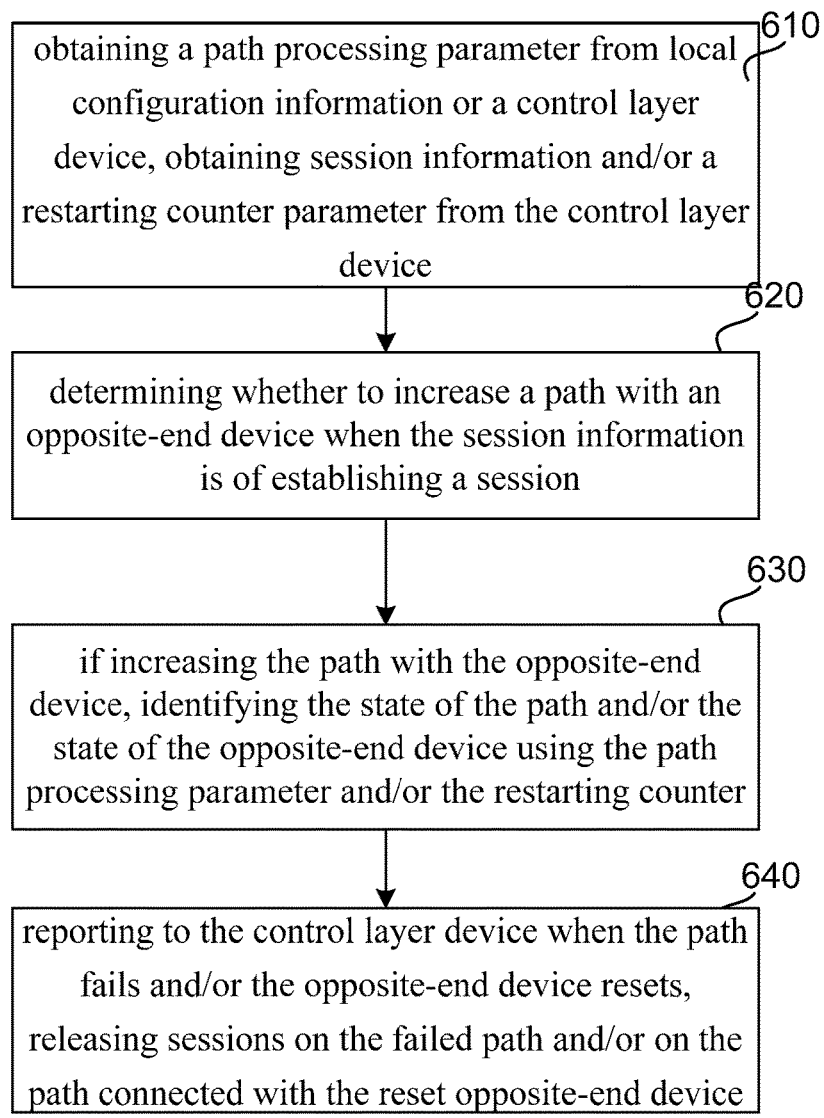
FIG. 6 is a flowchart of a method for processing a communication path according to embodiment 2 of the present invention.
Figure 7:
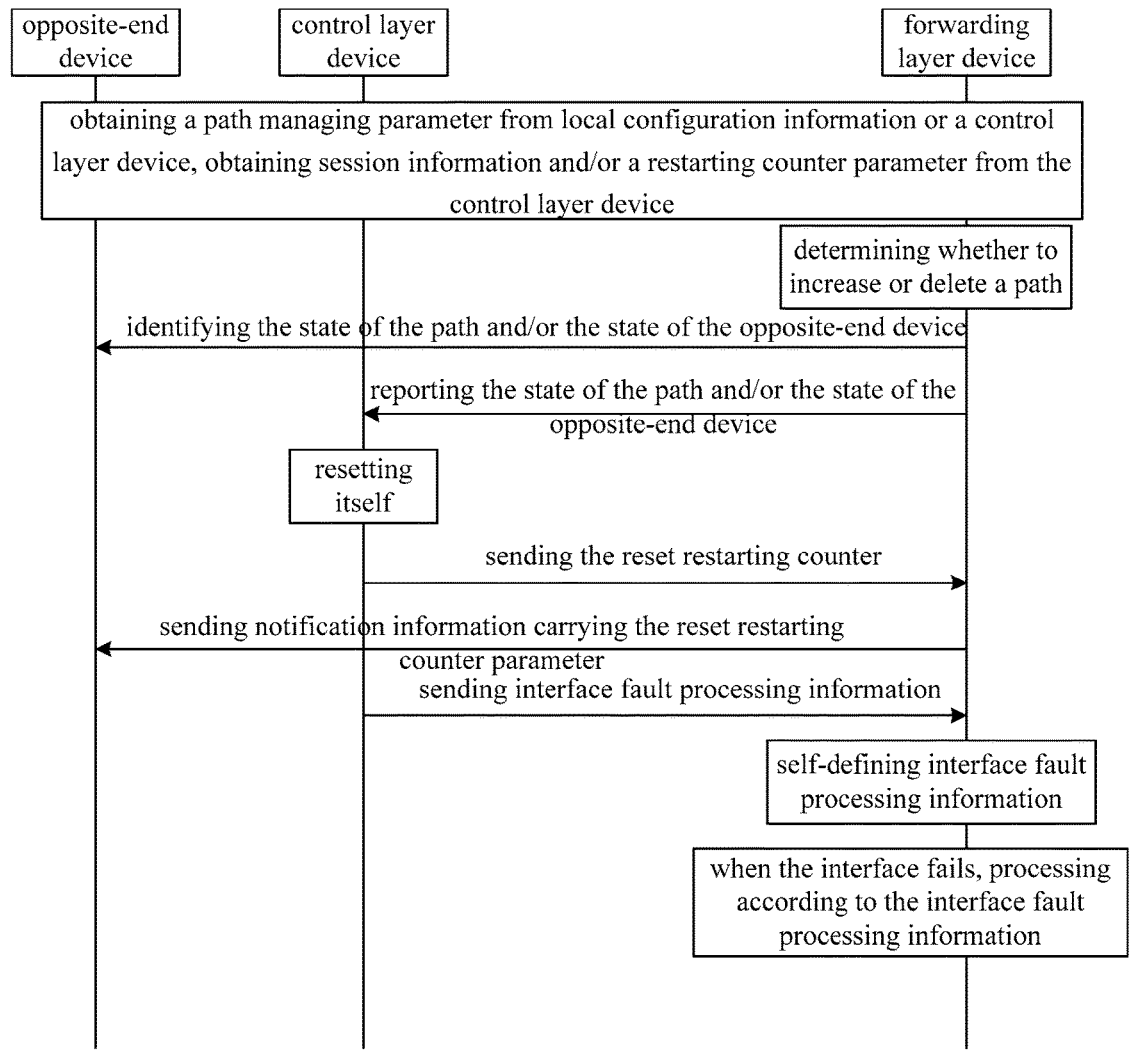
FIG. 7 is a signaling flowchart of the method for processing the communication path according to embodiment 2 of the present invention.
Figure 8:
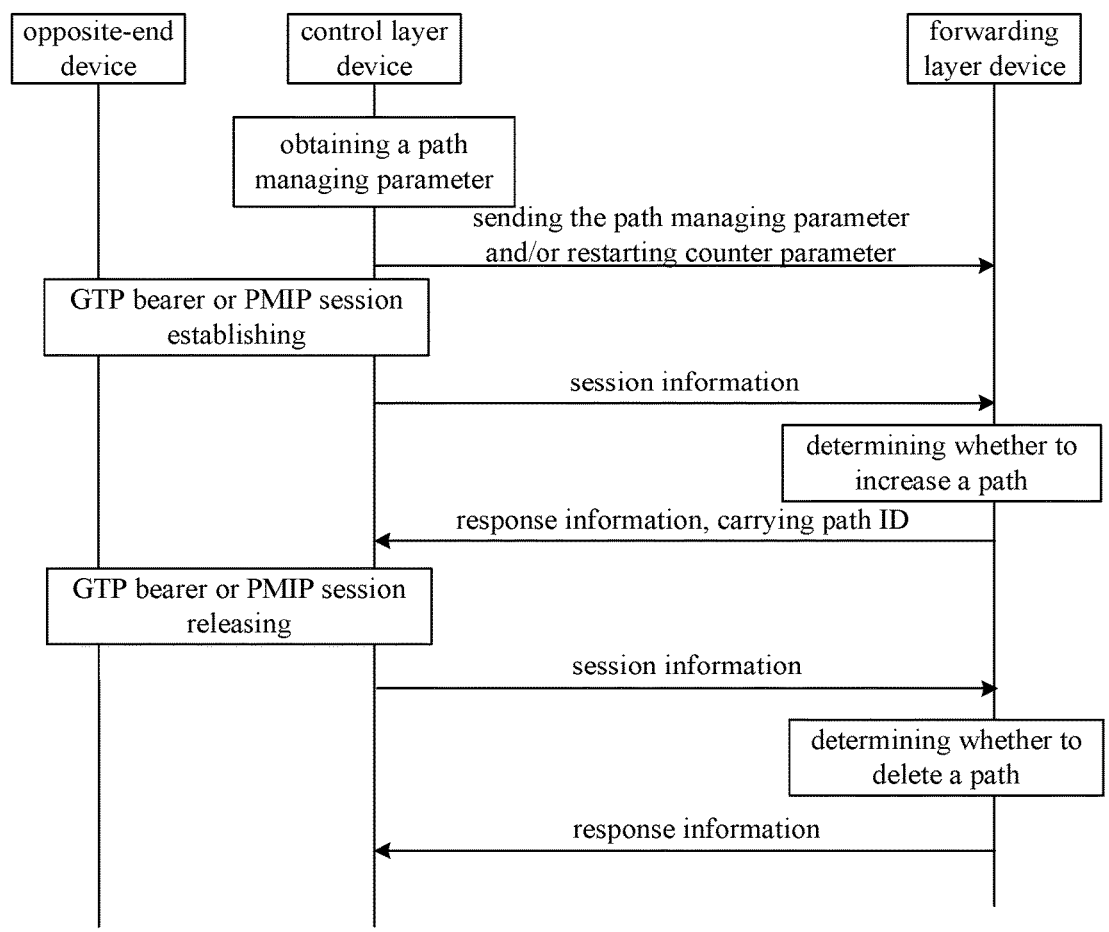
FIG. 8 is a signaling flowchart of obtaining information from a control layer device according to embodiment 2 of the present invention.
Figure 9:
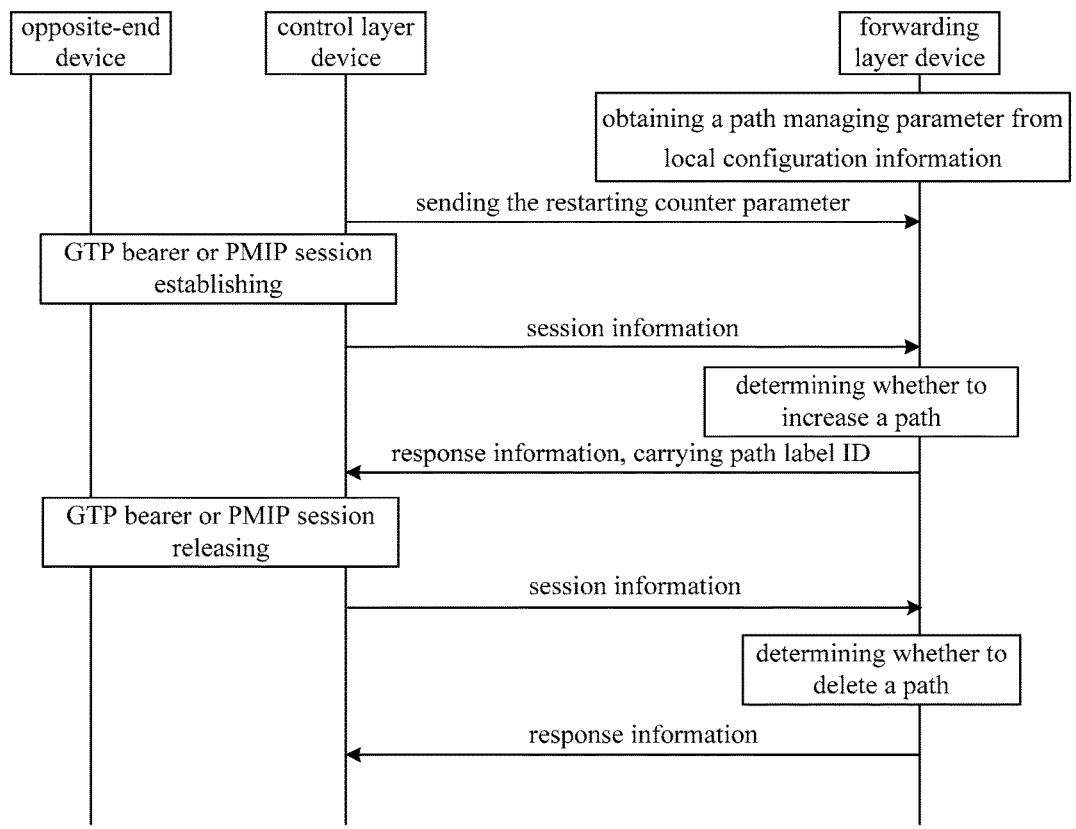
FIG. 9 is a signaling flowchart of obtaining information from local configuration information according to embodiment 2 of the present invention.

A method for processing a communication path, which is disclosed in embodiments of the present invention, is described in details taking FIG. 6 as an example, and FIG. 6 is a flowchart of a method for processing a communication path according to embodiment 2 of the present invention In the method for processing the communication path according to the embodiment of the present invention, a forwarding layer device obtains a path managing parameter from local configuration information or from a control layer device, obtains session information and/or a restarting counter parameter from the control layer device, the forwarding layer device identifies whether to increase or delete a path with an opposite-end device according to the session information, if increasing the path with the opposite-end device, identifies the state of the path and/or the state of the opposite-end device, the forwarding layer device reports the identified fault state of the path and/or the reset state of the opposite-end device to the control layer device when identifying that the path fails and/or the opposite-end device is reset, meanwhile, releases sessions on the failed path and/or on the path connected with the reset opposite-end device, the executive body in the embodiment of the present invention is the forwarding layer device, as shown in FIG. 6, and combined with the signaling flowchart in FIG. 7, which is a signaling flowchart of the method for processing the communication path according to embodiment 2 of the present invention, the following steps are needed for implementing the method for processing the communication path, which specifically include:

Step 610, The forwarding layer device obtains the path managing parameter from the local configuration information or from the control layer device, and obtains the path information and/or the restarting counter parameter from the control layer device;

Specifically, in one implementing mode, as shown in FIG. 8, which is a signaling flowchart of obtaining information from the control layer device according to embodiment 2 of the present invention; the control layer device sends the path managing parameter and/or the restarting counter parameter to the forwarding layer device;

The path managing parameter includes: a sending period, a time threshold, a threshold of times and other parameters;

In another implementing mode, as shown in FIG. 9, which is a signaling flowchart of obtaining information from the local configuration information according to embodiment 2 of the present invention; the forwarding layer device obtains the path managing parameter from the local configuration information, the control layer device sends the restarting counter parameter to the forwarding layer device;

The path managing parameter includes: a sending period, a time threshold, a threshold of times and other parameters;

After the forwarding layer device obtains the restarting counter parameter from the control layer device, the control layer device performs communication negotiation with the opposite-end device, the communication negotiation specifically is: a communication negotiation with an opposite-end device which is ready to establish a communication path about establishing the session, or a communication negotiation with an opposite-end device which has already established a communication path about whether to release the session, the communication negotiation is the prior art, which will not be repeated here, after the communication negotiation with the opposite-end device, the control layer device sends the session information to the forwarding layer device, where the session information carries a session path type (GTP or PMIP), a source IP address, a source port, a destination IP address, and a destination port.

Figure 10:
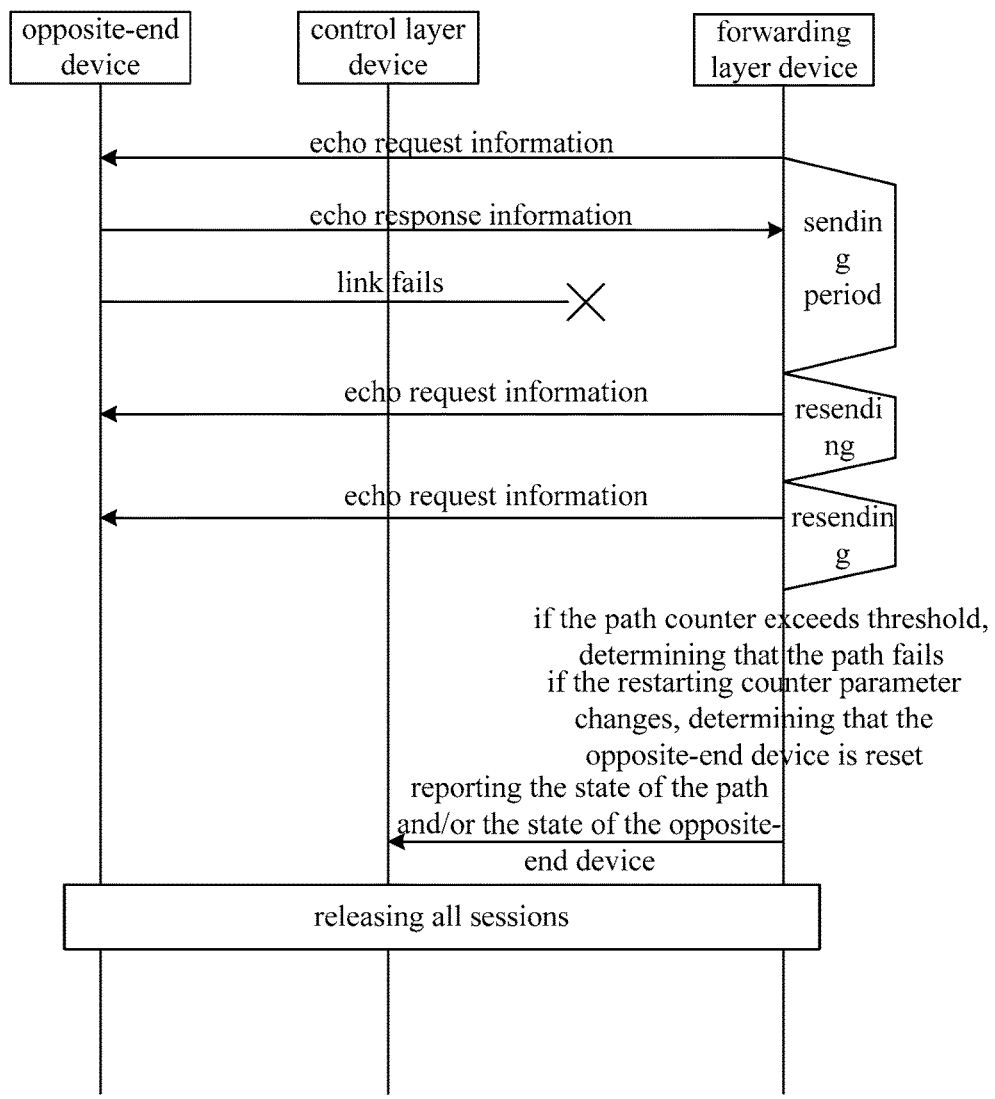
FIG. 10 is a signaling flowchart of identifying the state of a path and the state of an opposite-end device according to embodiment 2 of the present invention.

Step 620, When the session information is of establishing a session, the forwarding layer device determines whether to increase a path with the opposite-end device;

Specifically, according to the description of step 610, after the control layer device communicates with the opposite-end device about establishing GTP bearer or PMIP session, the control layer device sends the session information to the forwarding layer device, when the session information is of establishing the session, the forwarding layer device determines whether to increase the path with the opposite-end device, if the forwarding layer device determines that it is the first time to establish the GTP bearer or PMIP session with the opposite-end device, it deems necessary to increase the path, and will increase the path with the opposite-end device;

After increasing the path with the opposite-end device, the forwarding layer device sends response information to the control layer device, and sets a path counter for this path;

the response information is used to notify the control layer device that the path has been increased with the opposite-end device;

Optionally, after increasing the path with the opposite-end device, the forwarding layer device can also self-define a path label set for the path; or the forwarding layer device can identify the path using the path type, the path IP address, and the path port carried in the path information, so the response information also includes the path label of the path;

According to the description of step 610, after communicating with the opposite-end device about being ready to release the GTP bearer or PMIP session, the control layer device carries information of deleting the path in the session information, and sends the session information to the forwarding layer device, the forwarding layer device determines whether to delete the path, if determining that it is the last GTP bearer or PMIP session with the opposite-end device, the forwarding layer device deletes the existing path with the opposite-end device, and sends response information to the control layer device, to notify the control layer device that the existing path with the opposite-end device has been deleted;

It should be noted that, it has been described in step 610 that the path managing parameter can be obtained from the local configuration information of the forwarding layer or from the control layer device, when the values of the obtained path managing parameter are different, the path managing parameter sent by the control layer device is used in preference, moreover, the path managing parameter sent by the control layer device is applicable for one path as well as a plurality of paths;

Step 630, If increasing the path with the opposite-end device, the forwarding layer device identifies the state of the path and/or the state of the opposite-end device using the path managing parameter and/or the restarting counter parameter replied by the opposite-end device;

Specifically, according to the description of step 620, the forwarding layer device identifies the state of the established path and/or the state of the corresponding opposite-end device using the obtained path managing parameter and/or the restarting counter parameter, the specific process is, as shown in FIG. 10, which is a signaling flowchart of identifying the state of the path and the state of the opposite-end device according to embodiment 2 of the present invention:

according to the time threshold, the forwarding layer device sends echo request information to the opposite-end device periodically, the period can be set as needed, such as 30 seconds; the echo request information can further include the restarting counter parameter, the forwarding layer device determines whether the echo response information sent by the opposite-end device is received within the time threshold; if the forwarding layer device receives the echo response information sent by the opposite-end device within the time threshold, the forwarding layer device clears the path counter of this path, meanwhile, determines whether the echo response information includes the restarting counter parameter replied by the opposite-end device, if the echo response information includes the restarting counter parameter replied by the opposite-end device, identifies whether the value of the restarting counter parameter is changed (generally, whether the value of the restarting counter parameter is incremented by 1), if the value of the restarting counter parameter is incremented by 1, the forwarding layer device confirms that the opposite-end device has been reset, then sets the state of the opposite-end device as a reset state;

if the echo response information sent by the opposite-end device is not received within the time threshold, the forwarding layer device makes the value of the path counter of this path be incremented by 1;

then the forwarding layer device determines whether the value of the path counter of this path exceeds the threshold of times; if the value of the path counter of this path exceeds the threshold of times, sets the state of this path as a fault state.

Step 640, The forwarding layer device reports the fault state of the path and/or the reset state of the opposite-end device to the control layer device when the path fails and/or the opposite-end device is reset, releases all sessions on the failed path and/or on the path connected with the reset opposite-end device.

Specifically, according to the description of step 630, when the path fails and/or the opposite-end device is reset, the forwarding layer device reports the fault state of the path and/or the reset state of the opposite-end device to the control layer device using the path label or using the path type, the path IP address, and the path port carried in the path information in step 620, meanwhile, releases the sessions on the failed path and/or on the path connected with the reset opposite-end device by itself;

When the state of the path is the fault state, after reporting the fault state of the path to the control layer device, the forwarding layer device releases all sessions on the failed path, clears the information of the failed path, such as GTP bearer or PMIP session, or directly delete the failed path;

When the state of the opposite-end device is the reset state, after reporting the reset state of the opposite-end device to the control layer device, the forwarding layer device releases all sessions on the path, clears the information of the path, such as GTP bearer or PMIP session, or directly delete the path;

Optionally, after the forwarding layer device processes the path with fault state or the reset state of the opposite-end device, it can also include steps of: receiving reset information of the control layer device itself which is sent by the control layer device, the reset information includes the restarting counter parameter which is reset by the control layer device; sending notification information carrying the reset restarting counter parameter to the opposite-end device which communicates with the control layer device, so that the opposite-end device can be notified that the control layer device resets itself; the steps can be performed at any of the steps above;

Specifically, when the control layer device fails, the control layer device resets itself, after resetting itself, the control layer device sends the reset information of itself to the forwarding layer device, the forwarding layer device receives the reset information of the control layer device itself which is sent by the control layer device, where the reset information includes the restarting counter parameter which is reset by the control layer device; after receiving the restarting counter parameter which is reset by the control layer device, the forwarding layer device sends the notification information carrying the reset restarting counter parameter to the opposite-end device which communicates with the control layer device, so that all the opposite-end devices can be notified that the control layer device resets itself, and can reset the restarting counter parameters.

Optionally, after the forwarding layer device processes the path with fault state or the reset state of the opposite-end device, it can also include the step of: receiving first interface fault processing information sent by the control layer device;

Specifically, the control layer device also sends the first interface fault processing information to the forwarding layer device, so as to instruct the process mode of the forwarding layer device processing interface fault when a problem of the interface between the control layer device and the forwarding layer device occurs, the step can be performed at any of the steps above;

The first interface fault processing information is instructed by the control layer device for any or all of the sessions, the forwarding layer device receives the first interface fault processing information sent by the control layer device; the first interface fault processing information instructed by the control layer device for any of the sessions is set as the first priority, the first interface fault processing information instructed by the control layer device for all of the sessions is set as the second priority; or The forwarding layer device self-defines second interface fault processing information, the self-defined second interface fault processing information is set as the third priority;

The first priority is higher than the second priority and the third priority, the second priority is higher than the third priority;

When the interface with the control layer device fails, the forwarding layer device processes according to the priority of the received interface fault processing information;

The interface fault processing information specifically is: terminating the connected session immediately when the interface with the control layer device fails; or terminating the connected session after the allocated quota is exhausted when the interface with the control layer device fails; or keeping the connected session when the interface with the control layer device fails.

By applying the method for processing the communication path according to embodiments of the present invention, the forwarding layer device obtains various parameters from the control layer device or the local configuration information, determines by itself, according to the instruction of the control layer device, whether to establish or delete the path with the opposite-end device, identifies the state of the path and the state of the opposite-end device, and performs corresponding process to the failed path and/or the path connected with the reset opposite-end device, compared to the prior art that the control layer device performs corresponding process by itself to the failed path or the path connected with the reset opposite-end device, signaling or information between the control layer device and the forwarding layer device is reduced, and misjudgment of the path or the opposite-end device reset is reduced.

Figure 11:
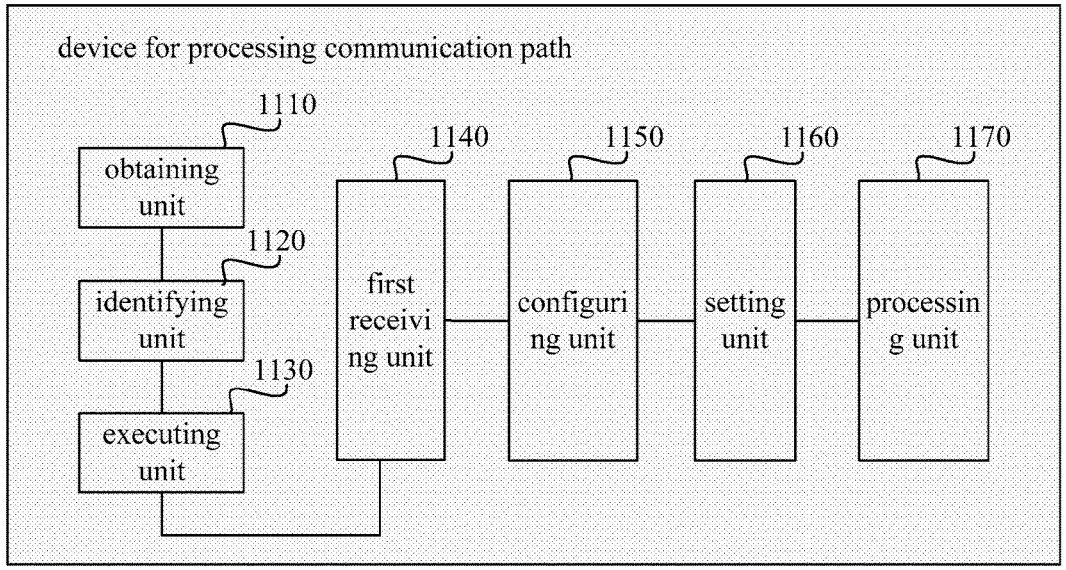
FIG. 11 is a diagram of a device for processing a communication path, which is used to implement the method of embodiment 1, according to embodiment 3 of the present invention.

Accordingly, embodiments of the present invention also provide a device for processing a communication path, as shown in FIG. 11, which is a diagram of a device for processing a communication path, which is used to implement the method of embodiment 1, according to embodiment 3 of the present invention, each unit of the device exists in a forwarding layer device, the device includes: an obtaining unit 1110, an identifying unit 1120 and an executing unit 1130;

The obtaining unit 1110 is configured to obtain a path managing parameter from local configuration information or from a control layer device, obtain path information and/or a restarting counter parameter from the control layer device, and send the obtained path managing parameter, path information and/or restarting counter parameter to the identifying unit;

The identifying unit 1120 is configured to receive the path managing parameter, the path information and/or the restarting counter parameter sent by the obtaining unit, increase a path with an opposite-end device when the path information is of increasing a path, identify the state of the path and/or the state of the opposite-end device using the path managing parameter and/or the restarting counter parameter replied by the opposite-end device, and send the state of the path and/or the state of the opposite-end device to the executing unit;

The executing unit 1130 is configured to receive the state of the path and/or the state of the opposite-end device sent by the identifying unit, report the fault state of the path and/or the reset state of the opposite-end device to the control layer device when the path fails and/or the opposite-end device is reset, and release sessions on the failed path and/or on the path connected with the reset opposite-end device;

The obtaining unit 1110 is configured to receive reset information of the control layer device itself which is sent by the control layer device, where the reset information includes the restarting counter parameter which is reset by the control layer device, and send the restarting counter parameter which is reset by the control layer device to a sending unit;

The identifying unit 1120 is configured to receive the restarting counter parameter which is reset by the control layer device, send notification information to the opposite-end device, the notification information carries the reset restarting counter parameter, so that the opposite-end device can be notified that the control layer device resets itself.

The executing unit 1130 is specifically configured to: delete the failed path or delete the path connected with the reset opposite-end device when the path fails and/or the opposite-end device is reset.

The identifying unit 1120 is also configured to, send response information to the control layer device, the response information is used to notify the control layer device that the path has been increased with the opposite-end device;

The identifying unit 1120 can be further configured to, receive a path label which is set by the control layer device for the path, or self-define a path label of the path, so that the response information also includes the path label of the path; or identify the path using the path type, the path IP address, and the path port carried in the path information;

The executing unit 1130 is specifically configured to, report the fault state of the path and/or the reset state of the opposite-end device to the control layer device using the path label or using the path type, path IP address, path port carried in the path information.

The identifying unit 1120 is also configured to set a path counter for the path;

The path managing parameter includes a time threshold and a threshold of times;

The identifying unit 1120 is further specifically configured to, according to the time threshold, send echo request information to the opposite-end device periodically, the echo request information can further include the restarting counter parameter;

determine whether the echo response information sent by the opposite-end device is received within the time threshold;

if the echo response information sent by the opposite-end device is received within the time threshold, clear the path counter, determine whether the echo response information includes the restarting counter parameter replied by the opposite-end device, if the echo response information includes the restarting counter parameter replied by the opposite-end device, identify whether the value of the restarting counter parameter is incremented by 1, if the value of the restarting counter parameter in the echo response information is incremented by 1, set the state of the opposite-end device as a reset state;

if the echo response information sent by the opposite-end device is not received within the time threshold, make the value of the path counter be incremented by 1;

determine whether the value of the path counter exceeds the threshold of times;

if the value of the path counter exceeds the threshold of times, set the state of the path as a fault state.

The identifying unit 1120 is also specifically configured to: when the path information is of deleting the path, delete the path which has been established with the opposite-end device;

send response information to the control layer device, to notify the control layer device that the established path is deleted.

The device also includes: a first receiving unit 1140, configured to receive first interface fault processing information which is instructed by the control layer device for any or all of the sessions; or a configuring unit 1150, configured to self-define second interface fault processing information;

a setting unit 1160, configured to set the first interface fault processing information instructed by the control layer device for any of the sessions as the first priority, set the first interface fault processing information instructed by the control layer device for all of the sessions as the second priority, set the self-defined second interface fault processing information as the third priority;

a processing unit 1170, configured to process according to the priorities of the first interface fault processing information or the second interface fault processing information when the interface with the control layer device fails;

Wherein, the first interface fault processing information or the second interface fault processing information specifically is: terminating the connected session immediately when the interface with the control layer device fails; or terminating the connected session after the allocated quota is exhausted when the interface with the control layer device fails; or keeping the connected session when the interface with the control layer device fails.

By applying the device for processing the communication path according to embodiments of the present invention, the obtaining unit obtains various parameters from the control layer device or from the local configuration information, the identifying unit increases or deletes the path with the opposite-end device according to the instruction of the control layer device, and identifies the state of the path and/or the state of the opposite-end device using the obtained various parameters, the executing unit performs corresponding process to the failed path and/or the path connected with the reset opposite-end device, compared to the prior art, the control layer device performs corresponding process by itself to the failed path or the path connected with the reset opposite-end device, signaling or information between the control layer device and the forwarding layer device is reduced, and misjudgment of the path or the opposite-end device reset is reduced.

Figure 12:
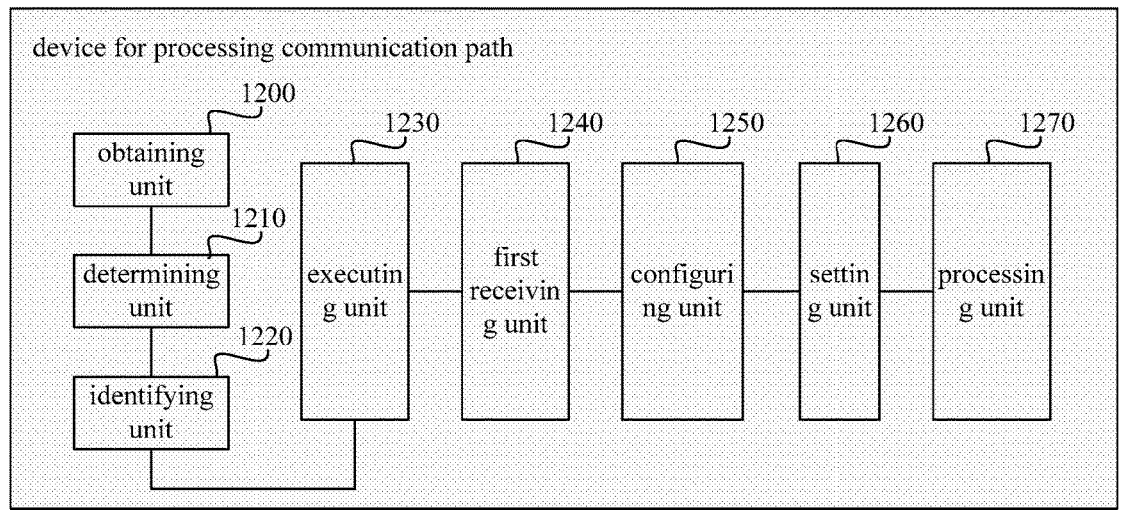
FIG. 12 is a diagram of a device for processing a communication path, which is used to implement the method of embodiment 2, according to embodiment 4 of the present invention.

Accordingly, embodiments of the present invention also provide a device for processing a communication path, as shown in FIG. 12, which is a diagram of a device for processing a communication path, which is used to implement the method of embodiment 2, according to embodiment 4 of the present invention, each unit of the device exists in a forwarding layer device, the device includes: an obtaining unit 1200, a determining unit 1210, an identifying unit 1220 and an executing unit 1230;

The obtaining unit 1200 in the device is configured to obtain a path managing parameter from local configuration information or a control layer device, obtain session information and/or a restarting counter parameter from the control layer device, send the session information to the determining unit, and send the path managing parameter and/or the restarting counter parameter to the identifying unit;

The determining unit 1210 is configured to receive the session information sent by the obtaining unit, when the session information is of establishing a session, determine whether to increase a path with an opposite-end device, and send the determining result to the identifying unit;

The identifying unit 1220 is configured to receive the path managing parameter and/or restarting counter parameter sent by the obtaining unit and receive the determining result sent by the determining unit, if increasing the path with the opposite-end device, identify the state of the path and/or the state of the opposite-end device using the path managing parameter and/or the restarting counter parameter replied by the opposite-end device, and send the identified state of the path and/or the state of the opposite-end device to the executing unit;

The executing unit 1230 is configured to receive the state of the path and/or the state of the opposite-end device sent by the identifying unit, report the fault state of the path and/or the reset state of the opposite-end device to the control layer device when the path fails and/or the opposite-end device is reset, and release all sessions on the failed path and/or on the path connected with the reset opposite-end device;

The obtaining unit 1200 is configured to receive reset information of the control layer device itself which is sent by the control layer device, where the reset information includes the restarting counter parameter which is reset by the control layer device, and send the restarting counter parameter which is reset by the control layer device to a sending unit;

The identifying unit 1220 is configured to receive the restarting counter parameter which is reset by the control layer device, send notification information carrying the reset restarting counter parameter, to the opposite-end device which communicates with the control layer device, so that the opposite-end device can be notified that the control layer device resets itself.

The executing unit 1230 is specifically configured to: delete the failed path or delete the path connected with the reset opposite-end device when the path fails and/or the opposite-end device is reset;

The determining unit 1210 is specifically configured to: increase the path with the opposite-end device when the establishing session is the first session with the opposite-end device;

The identifying unit 1220 is also configured to, send response information to the control layer device, the response information is used to notify the control layer device that the path has been increased with the opposite-end device;

The identifying unit 1220 can be further configured to, self-define a path label of the path, so that the response information also includes the path label of the path; or identify the path using the path type, the path IP address, and the path port carried in the path information;

The executing unit 1230 is specifically configured to, report the fault state of the path and/or the reset state of the opposite-end device to the control layer device using the path label or using the path type, the path IP address, and the path port carried in the path information;

The identifying unit 1220 is also configured to set a path counter for the path;

The path managing parameter includes a time threshold and a threshold of times;

The identifying unit 1220 is further specifically configured to, according to the time threshold, send echo request information to the opposite-end device periodically, the echo request information includes the restarting counter parameter;

determine whether the echo response information sent by the opposite-end device is received within the time threshold;

if the echo response information sent by the opposite-end device within the time threshold, clear the path counter, determine whether the echo response information includes the restarting counter parameter replied by the opposite-end device, if the echo response information includes the restarting counter parameter replied by the opposite-end device, identify whether the value of the restarting counter parameter is incremented by 1, if the value of the restarting counter parameter in the echo response information is incremented by 1, set the state of the opposite-end device as a reset state;

if the echo response information sent by the opposite-end device is not received within the time threshold, make the value of the path counter be incremented by 1;

determine whether the value of the path counter exceeds the threshold of times;

if the value of the path counter exceeds the threshold of times, set the state of the path as a fault state.

The determining unit 1210 is also specifically configured to: determine whether to delete the path with the opposite-end device when the session information is of deleting the path;

when the deleting session information is the last session with the opposite-end device, delete the path which has been established with the opposite-end device;

send response information to the control layer device, to notify the control layer device that the established path is deleted.

The device also includes: a first receiving unit 1240, configured to receive first interface fault processing information which is instructed by the control layer device for any or all of the sessions; or a configuring unit 1250, configured to self-define second interface fault processing information;

a setting unit 1260, configured to set the first interface fault processing information instructed by the control layer device for any of the sessions as the first priority, set the first interface fault processing information instructed by the control layer device for all of the sessions as the second priority, set the self-defined second interface fault processing information as the third priority;

a processing unit 1270, configured to process according to the priorities of the first interface fault processing information or the second interface fault processing information when the interface with the control layer device fails;

Wherein, the first interface fault processing information or the second interface fault processing information specifically is: terminating the connected session immediately when the interface with the control layer device fails; or terminating the connected session after the allocated quota is exhausted when the interface with the control layer device fails; or keeping the connected session when the interface with the control layer device fails.

By applying the device for processing the communication path according to embodiments of the present invention, the obtaining unit obtains various parameters from the control layer device or the local configuration information, the determining unit determines by itself, according to the instruction of the control layer device, whether to establish or delete the path with the opposite-end device, the identifying unit identifies the state of the path and/or the state of the opposite-end device, the executing unit performs corresponding process to the failed path and/or the path connected with the reset opposite-end device, compared to the prior art, the control layer device performs corresponding process by itself to the failed path or the path connected with the reset opposite-end device, signaling or information between the control layer device and the forwarding layer device is reduced, and misjudgment of the path or the opposite-end device reset is reduced.

Figure 13:
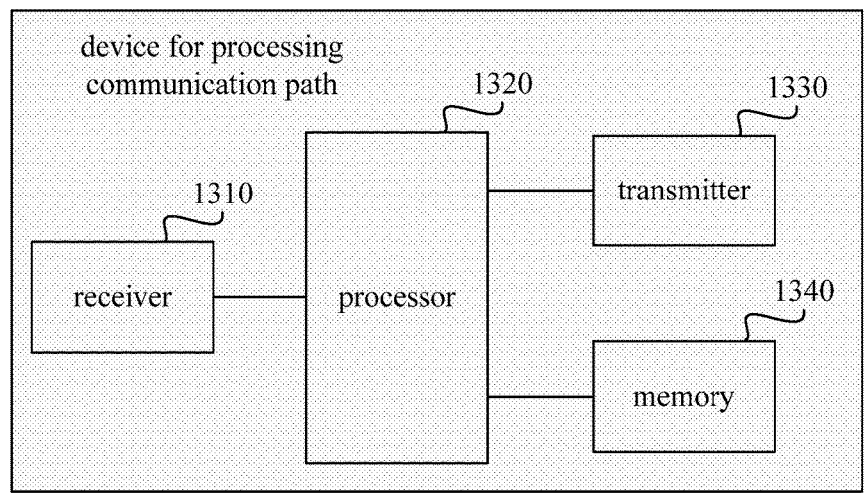
FIG. 13 is a diagram of a device for processing a communication path, which is used to implement the method of embodiment 1, according to embodiment 5 of the present invention.

Furthermore, a device for processing a communication path according to embodiments of the present invention can also adopt implementing mode as follows, so as to implement the method for processing the communication path according to embodiment 1 of the present invention, as shown in FIG. 13, the device for processing the communication path includes: a receiver 1310, a processor 1320 and a memory 1330.

The receiver 1310 in the device is configured to obtain path managing parameter from local configuration information or from a control layer device, obtain path information and/or a restarting counter parameter from the control layer device, and send the obtained path managing parameter, path information and/or restarting counter parameter to the processor;

The processor 1320 is configured to receive the path managing parameter, the path information and/or the restarting counter parameter sent by the receiver, increase a path with an opposite-end device when the path information is of increasing a path, identify the state of the path and/or the state of the opposite-end device using the path managing parameter and/or the restarting counter parameter replied by the opposite-end device;

The processor 1320 is also configured to report the fault state of the path and/or the reset state of the opposite-end device to the control layer device when the path fails and/or the opposite-end device is reset, and release all sessions on the failed path and/or on the path connected with the reset opposite-end device;

The memory 1330 is configured to store the execution procedure of the processor.

The receiver 1310 is specifically configured to, receive reset information of the control layer device itself which is sent by the control layer device, where the reset information includes the restarting counter parameter which is reset by the control layer device, and send the restarting counter parameter which is reset by the control layer device to the processor, the processor sends the restarting counter parameter which is reset by the control layer device to a transmitter;

The device also includes: the transmitter 1340, configured to receive the restarting counter parameter which is reset by the control layer device and sent by the processor, send notification information carrying the reset restarting counter parameter, to the opposite-end device which communicates with the control layer device, so that the opposite-end device can be notified that the control layer device resets itself.

The processor 1320 is also specifically configured to: delete the failed path or delete the path connected with the reset opposite-end device when the path fails and/or the opposite-end device is reset.

The processor 1320 is also specifically configured to, send response information to the control layer device, the response information is used to notify the control layer device that the path has been increased with the opposite-end device;

The processor 1320 can be further configured to, receive a path label which is set by the control layer device for the path, or self-define a path label of the path, so that the response information also includes the path label of the path; or identify the path using the path type, the path IP address, and the path port carried in the path information;

The processor 1320 is further specifically configured to, report the fault state of the path and/or the reset state of the opposite-end device to the control layer device using the path label or using the path type, the path IP address, and the path port carried in the path information.

The processor 1320 is also specifically configured to set a path counter for the path;

The transmitter 1340 is also specifically configured to send echo request information to the opposite-end device;

The receiver 1310 is also specifically configured to receive echo response information sent by the opposite-end device, and send the echo response information to the processor;

The path managing parameter includes a time threshold and a threshold of times;

The processor 1320 is also specifically configured to: according to the time threshold, instruct the transmitter periodically to send the echo request information to the opposite-end device, the echo request information can further include the restarting counter parameter;

determine whether the echo response information is received within the time threshold;

if the echo response information sent by the opposite-end device is received within the time threshold, clear the path counter, determine whether the echo response information includes the restarting counter parameter replied by the opposite-end device, if the echo response information includes the restarting counter parameter replied by the opposite-end device, identify whether the value of the restarting counter parameter is incremented by 1, if the value of the restarting counter parameter in the echo response information is incremented by 1, set the state of the opposite-end device as a reset state;

if the echo response information is not received within the time threshold, make the value of the path counter be incremented by 1;

determine whether the value of the path counter exceeds the threshold of times;

if the value of the path counter exceeds the threshold of times, set the state of the path as a fault state.

The processor 1320 is also specifically configured to: when the path information is of deleting the path, delete the path which has been established with the opposite-end device, send response information to the control layer device, to notify the control layer device that the established path is deleted.

The receiver 1340 is also specifically configured to: receive first interface fault processing information which is instructed by the control layer device for any or all of the sessions;

The processor 1320 is specifically configured to, self-define to configure second interface fault processing information;

The processor 1320 is also specifically configured to, set the first interface fault processing information instructed by the control layer device for any of the sessions as the first priority, set the first interface fault processing information instructed by the control layer device for all of the sessions as the second priority, set the self-defined second interface fault processing information as the third priority;

The processor 1320 is further specifically configured to process according to the priorities of the first interface fault processing information or the second interface fault processing information when the interface with the control layer device fails;

Wherein, the first interface fault processing information or the second interface fault processing information specifically is: terminating the connected session immediately when the interface with the control layer device fails; or terminating the connected session after the allocated quota is exhausted when the interface with the control layer device fails; or keeping the connected session when the interface with the control layer device fails.

By applying the device for processing the communication path according to embodiments of the present invention, the receiver obtains various parameters from the control layer device or from the local configuration information, and sends the various parameters to the processor, the processor increases or deletes the path with the opposite-end device according to the instruction of the control layer device, and identifies the state of the path and/or the state of the opposite-end device, the processor also performs corresponding process to the failed path and/or the path connected with the reset opposite-end device, compared to the prior art that the control layer device performs corresponding process by itself to the failed path or the path connected with the reset opposite-end device, signaling or information between the control layer device and the forwarding layer device is reduced, and misjudgment of the path or the opposite-end device reset is reduced.

Figure 14:
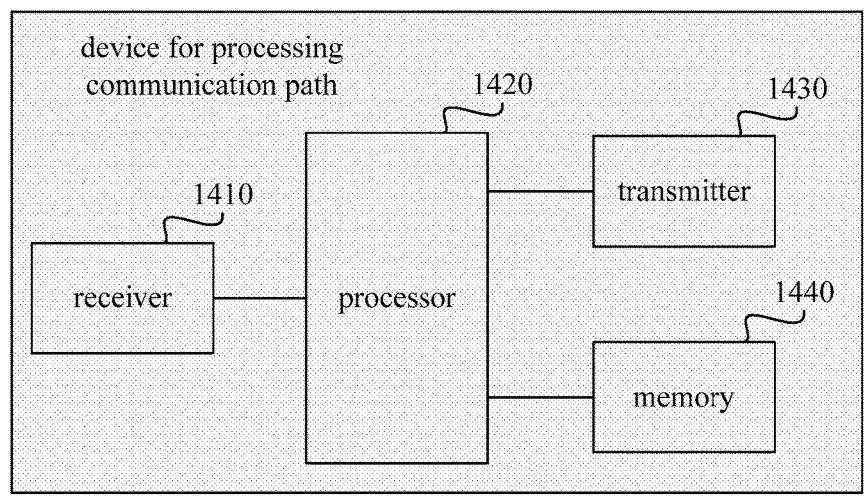
FIG. 14 is a diagram of a device for processing a communication path, which is used to implement the method of embodiment 2, according to embodiment 6 of the present invention.

Furthermore, a device for processing a communication path according to embodiments of the present invention can also adopt implementing mode as follows, so as to implement the method for processing the communication path according to embodiment 2 of the present invention, as shown in FIG. 14, the device for processing the communication path includes: a receiver 1410, a processor 1420 and a memory 1430.

The receiver 1410 in the device, is configured to obtain a path managing parameter from local configuration information or from a control layer device, obtain path information and/or a restarting counter parameter from the control layer device, and send the obtained path managing parameter, path information and/or restarting counter parameter to the processor;

The processor 1420, is configured to receive the path managing parameter, the session information and/or the restarting counter parameter sent by the receiver, determine whether to increase a path with an opposite-end device when the session information is of establishing a session;

The processor 1420 is also configured to, if increasing the path with the opposite-end device, identify the state of the path and/or the state of the opposite-end device using the path managing parameter and/or the restarting counter parameter replied by the opposite-end device;

The processor 1420 is also configured to report the fault state of the path and/or the reset state of the opposite-end device to the control layer device when the path fails and/or the opposite-end device is reset, and release all sessions on the failed path and/or on the path connected with the reset opposite-end device;

The memory 1430 is configured to store the execution procedure of the processor.

The receiver 1410 is specifically configured to: receive reset information of the control layer device itself which is sent by the control layer device, where the reset information includes the restarting counter parameter which is reset by the control layer device, and send the restarting counter parameter which is reset by the control layer device to the processor, the processor sends the restarting counter parameter which is reset by the control layer device to a transmitter;

The device also includes: the transmitter 1440, configured to receive the restarting counter parameter which is reset by the control layer device and sent by the processor, send notification information, carrying the reset restarting counter parameter, to the opposite-end device which communicates with the control layer device, so that the opposite-end device can be notified that the control layer device resets itself.

The processor 1420 is also specifically configured to: delete the failed path or delete the path connected with the reset opposite-end device when the path fails and/or the opposite-end device is reset.

The processor 1320 is also specifically configured to: send response information to the control layer device, the response information is used to notify the control layer device that the path has been increased with the opposite-end device;

The processor 1420 can be further configured to: self-define a path label of the path, so that the response information also includes the path label of the path; or to identify the path using the path type, the path IP address, and the path port carried in the path information;

The processor is further specifically configured to, report the fault state of the path and/or the reset state of the opposite-end device to the control layer device using the path label or using the path type, the path IP address, and the path port carried in the path information.

The processor 1420 is also specifically configured to set a path counter for the path;

The transmitter 1440 is also specifically configured to send echo request information to the opposite-end device;

The receiver 1410 is also specifically configured to receive echo response information sent by the opposite-end device, and send the echo response information to the processor;

The path managing parameter includes a time threshold and a threshold of times;

The processor 1420 is also specifically configured to: according to the time threshold, instruct the transmitter periodically to send the echo request information to the opposite-end device, the echo request information can further include the restarting counter parameter;

determine whether the echo response information is received within the time threshold;

if the echo response information sent by the opposite-end device is received within the time threshold, clear the path counter, determine whether the echo response information includes the restarting counter parameter replied by the opposite-end device, if the echo response information includes the restarting counter parameter replied by the opposite-end device, identify whether the value of the restarting counter parameter is incremented by 1, if the value of the restarting counter parameter in the echo response information is incremented by 1, set the state of the opposite-end device as a reset state;

if the echo response information is not received within the time threshold, make the value of the path counter be incremented by 1;

determine whether the value of the path counter exceeds the threshold of times;

if the value of the path counter exceeds the threshold of times, set the state of the path as a fault state.

The processor 1420 is also specifically configured to: when the session information is of deleting the session, determine whether to delete the path with the opposite-end device;

delete the path which has been established with the opposite-end device, when the deleting session information is the last session with the opposite-end device;

send response information to the control layer device, to notify the control layer device that the established path is deleted.

The receiver 1440 is also specifically configured to: receive first interface fault processing information which is instructed by the control layer device for any or all of the sessions;

The processor 1420 is specifically configured to, self-define to configure second interface fault processing information;

The processor 1420 is also specifically configured to, set the first interface fault processing information instructed by the control layer device for any of the sessions as the first priority, set the first interface fault processing information instructed by the control layer device for all of the sessions as the second priority, set the self-defined second interface fault processing information as the third priority;

The processor 1420 is further specifically configured to process according to the priorities of the first interface fault processing information or the second interface fault processing information when the interface with the control layer device fails;

Wherein, the first interface fault processing information or the second interface fault processing information specifically is: terminating the connected session immediately when the interface with the control layer device fails; or terminating the connected session after the allocated quota is exhausted when the interface with the control layer device fails; or keeping the connected session when the interface with the control layer device fails.

By applying the device for processing the communication path according to embodiments of the present invention, the receiver obtains various parameters from the control layer device or the local configuration information, and sends the various parameters to the processor and the memory, the processor determines by itself, according to the instruction of the control layer device, whether to increase or delete the path with the opposite-end device, and identifies the state of the path and/or the state of the opposite-end device, performs corresponding process to the failed path and/or the path connected with the reset opposite-end device, compared to the prior art, the control layer device performs corresponding process by itself to the failed path or the path connected with the reset opposite-end device, signaling or information between the control layer device and the forwarding layer device is reduced, and misjudgment of the path or the opposite-end device reset is reduced.

Persons skilled in the art should also realize that, the units and algorithm steps of each example described in combination with the embodiments disclosed herein can be implemented by an electronic hardware, a computer software or a combination of the two, in order to clearly illustrate the interchangeability of the hardware and software, composition and steps of each example have been generally described in the above descriptions according to the functions. It depends on the specific application and design constraints of the technical solutions that these functions will be implemented by a hardware or a software. Persons skilled in the art can use various methods to implement the described functions for each specific application, but such implementation should not be considered to exceed the scope of the present invention.

The methods and algorithm steps described in combination with the embodiments disclosed herein can be implemented by hardware, or a relevant hardware under the instruction of a program. The software module can be placed in a computer readable storage medium, such as a random access memory (RAM), a memory, a read only memory (ROM), an electrically programmable ROM, an electrically erasable programmable ROM, a register, a hard disk, a removable disk, a CD-ROM, or any other form of storage mediums known in the art.

The embodiments described above illustrate the objects, technical solutions and beneficial effects of the present invention in more details, it should be understood that, the above mentioned are only specific embodiments of the present invention, but not intended to limit the protection scope of the present invention, any modification, replacement, improvement etc without departing from the spirit and principles of the present invention, should fall within the protection scope of the present invention.

By applying the path managing device according to embodiments of the present invention, the forwarding layer device obtains various parameters from the control layer device or the local network system, increases or deletes the path according to the instruction of the control layer device, or determines by itself whether to increase or delete the path with the opposite-end device, and identifies the state of the path and/or the state of the opposite-end device using the obtained various parameters and reports to the control layer device, performs corresponding process according to the processing information of the control layer device, compared to the prior art, signaling or information between the control layer device and the forwarding layer device is reduced, and misjudgment of the path or the opposite-end device reset is reduced. Additionally, statements made herein characterizing the invention refer to an embodiment of the invention and not necessarily all embodiments.

What is claimed is:

1. A device for processing a communication path, the device comprising:
   a memory configured to store processor-executable instructions; and
   a processor configured to execute the processor-executable instructions to enable the device to:
   identify a state of a path between a forwarding layer device and an opposite-end device using a path processing parameter which comprises a time threshold and a threshold of times;
   report a fault state of the path to a control layer device when the path fails; and
   release sessions on the failed path.

2. The device according to claim 1, wherein the processor is further configured to execute the processor-executable instructions to enable the device to:
   report the fault state of the path to the control layer device using a path label or a path IP address for identifying the path.

3. The device according to claim 1, wherein the processor is further configured to execute the processor-executable instructions to enable the device to obtain the path processing parameter from local configuration information or from the control layer device.

4. A device for processing a communication path, the device comprising:
   a memory configured to store processor-executable instructions; and
   a processor configured to execute the processor-executable instructions to enable the device to:
   receive fault state information of a path from a forwarding layer device;
   obtain a fault state of the path from the fault state information,
   wherein the fault state of the path is identified using a path processing parameter comprising a time threshold and a threshold of times, and the path is between the forwarding layer device and an opposite-end device.

5. The device according to claim 4, wherein the fault state of the path is obtained according to a path label or a path IP address for the path.

6. The device according to claim 4, wherein the processor is configured to execute the processor-executable instructions to enable the device to send the path processing parameter to the forward layer device.

7. A method for processing a communication path, the method comprising:
   identifying, by a forwarding layer device, a state of a path between the forwarding layer device and an opposite-end device using a path processing parameter comprising a time threshold and a threshold of times;
   reporting, by the forwarding layer device, a fault state of the path to a control layer device when the path fails; and
   releasing, by the forwarding layer device, sessions on the failed path.

8. The method according to claim 7, wherein the reporting, by the forwarding layer device, a fault state of the path comprising:
   reporting, by the forwarding layer device, the fault state of the path to the control layer device using a path label or a path IP address for identifying the path.

9. The method according to claim 7, wherein the method further comprising:
   obtaining, by the forwarding layer device, the path processing parameter from local configuration information or from the control layer device.

10. A method for processing a communication path, the method comprising:
    receiving, by a control layer device, fault state information of a path from a forwarding layer device;
    obtain, by the control layer device, a fault state of the path from the fault state information;
    wherein the fault state of the path is identified using a path processing parameter comprising a time threshold and a threshold of times, and the path is between the forwarding layer device and an opposite-end device.

11. The method according to claim 10, wherein the fault state of the path is obtained according to a path label or a path IP address for the path.

12. The method according to claim 10, wherein the processor is configured to execute the processor-executable instructions to enable the device to send the path processing parameter to the forward layer device.

* * * * *